R. Leitch,
Basin Faucet,
Nº 16,736. Patented Mar. 3, 1857.
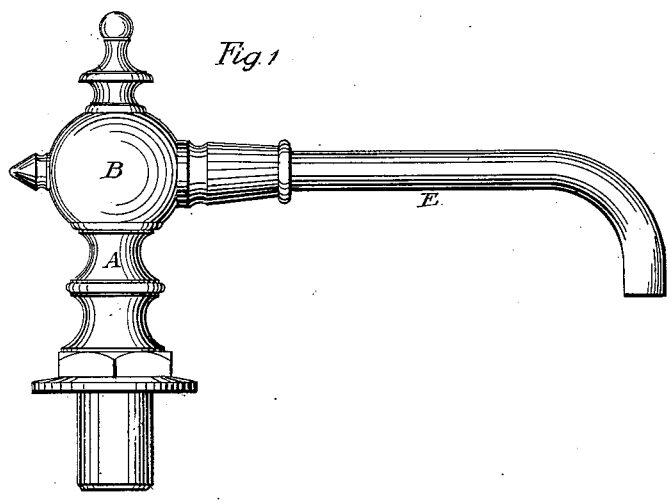
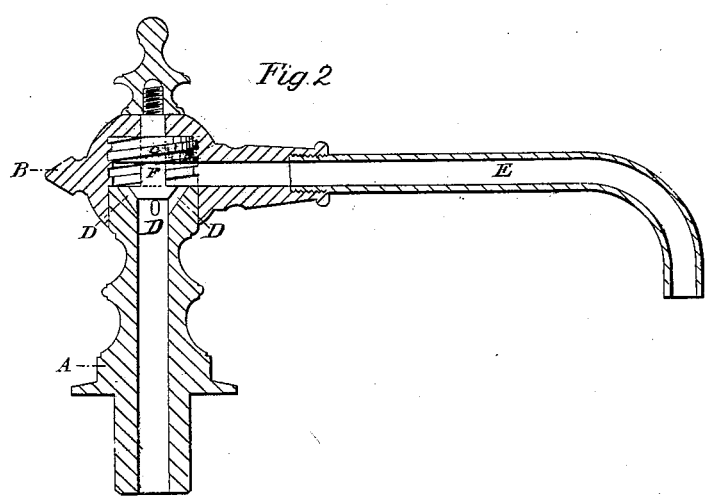

UNITED STATES PATENT OFFICE.

ROBERT LEITCH, OF BALTIMORE, MARYLAND.

BASIN-COCK.

Specification of Letters Patent No. 16,736, dated March 3, 1857.

*To all whom it may concern:*

Be it known that I, ROBERT LEITCH, of Baltimore city and State of Maryland, have invented a new and useful improvement in the construction of cocks for basins, by which the disadvantages of leaking and consequent frequent grinding are entirely surmounted; and I do hereby declare the following to be a full, clear, and exact description of the construction and operation of the same, reference being had to the annexed drawings, making a part of this specification, in which—

Figure 1 is an elevation, and Fig. 2 a section.

A is the stem taking place of the usual plug, on which the globe B of the cock turns in order to let on, and shut-off, the flow of the water, which is effected by the lifting and depressing of the loose stop piece C, on the periphery of which is chased a male screw thread, operated on by a corresponding female screw, or by stud pins, projecting into the aforesaid screw, by turning the globe in the usual manner, the female screw or stud pins running along the angle of the male screw lift it vertically from its seat to the amount of the pitch of said screw, thereby opening a communication by the holes D, D, D, from the hollow stem to the outlet E of the cock, the stop piece C being prevented from turning by the fixed square F on the stem A, on the extremity of which a washer nut is screwed holding the globe B firmly in its position. By turning the globe in the reverse direction, the stop piece C will be brought to its seat, by the aforesaid female screw or stud pins, running along the angle of the male screw and depressing its blank face against the holes D, D, D, thereby closing them, and cutting-off the communication.

What I claim as of my invention and desire to secure by Letters Patent, is—

The arrangement of the loose stop piece C, constructed with a male screw thread on the periphery, and the means for operating it vertically without turning, by the fixed square F, on the stem A, and a corresponding female screw thread, or its equivalent in the rotating globe of the cock B, substantially, and for the purpose as herein set forth.

ROBERT LEITCH.

Witnesses:
WILLIAM M. HENDERSON,
WM. H. BAYZAND.